(12) United States Patent
Sakumura et al.

(10) Patent No.: US 9,558,582 B2
(45) Date of Patent: Jan. 31, 2017

(54) IMAGE PROCESSING METHOD AND IMAGE PROCESSING APPARATUS

(71) Applicant: RIGAKU CORPORATION, Tokyo (JP)

(72) Inventors: Takuto Sakumura, Hachioji (JP); Yasukazu Nakaye, Ome (JP); Koichi Kajiyoshi, Hamura (JP); Satoshi Mikusu, Ome (JP)

(73) Assignee: RIGAKU Corporation, Tokyo (JP)

( * ) Notice: Subject to any disclaimer, the term of this patent is extended or adjusted under 35 U.S.C. 154(b) by 58 days.

(21) Appl. No.: 14/609,213

(22) Filed: Jan. 29, 2015

(65) Prior Publication Data
US 2015/0213623 A1  Jul. 30, 2015

(30) Foreign Application Priority Data

Jan. 30, 2014 (JP) .................... 2014-016100

(51) Int. Cl.
 *G06K 9/00* (2006.01)
 *G06T 15/08* (2011.01)
 *G06T 5/00* (2006.01)

(52) U.S. Cl.
 CPC ............ *G06T 15/08* (2013.01); *G06T 5/002* (2013.01); *G06T 2207/10116* (2013.01); *G06T 2207/20182* (2013.01)

(58) Field of Classification Search
 CPC ........... G06T 2207/10116; G06T 2207/20182; G06T 5/002; G06T 15/08

(Continued)

(56) References Cited

U.S. PATENT DOCUMENTS 6,360,025 B1   3/2002  Florent
7,136,454 B2  11/2006  Gerndt et al.
(Continued)

FOREIGN PATENT DOCUMENTS

EP       0 926 626 A1    6/1999
JP     2000-207550 A    7/2000
(Continued)

OTHER PUBLICATIONS

Aufrichtig et al., X-Ray Fluoroscopy Spatio-Temporal Filtering with Object Detection, IEEE transactions on medical imaging, vol. 14, No. 4, Dec. 1995.*

(Continued)

*Primary Examiner* — John Strege
(74) *Attorney, Agent, or Firm* — Birch, Stewart, Kolasch & Birch, LLP (57) ABSTRACT

An image processing method and an image processing apparatus which remove the effects of cosmic rays, noise and defective pixels without losing data in a specified time and which can correct image data efficiently and with high accuracy are provided. An image processing method of performing correction processing on an abnormal value of X-ray image data is provided which includes the steps of: (S3) determining whether or not there exists a target element with intensity significantly different from intensity of peripheral elements, in a three dimensional space formed with a space axis and a time axis defined by a series of captured image frames; and (S9) replacing the intensity of the target element with a replacement value calculated from the intensity of peripheral elements.

9 Claims, 11 Drawing Sheets

(58) Field of Classification Search
USPC .......................................................... 382/128
See application file for complete search history.

(56) References Cited

U.S. PATENT DOCUMENTS

| | | |
|---|---|---|
| 2005/0259790 A1 | 11/2005 | Gerndt et al. |
| 2006/0257044 A1* | 11/2006 | Chiu ........................ G06T 5/20 382/261 |
| 2010/0225790 A1* | 9/2010 | Sasaki ....................... G06T 5/50 348/241 |
| 2013/0051697 A1 | 2/2013 | Takahashi |
| 2013/0251282 A1* | 9/2013 | Min ........................ G06T 5/002 382/260 |
| 2014/0247365 A1* | 9/2014 | Gardner ................... H04N 5/21 348/165 |
| 2014/0341480 A1* | 11/2014 | Hamada ................. G06T 5/002 382/264 |

FOREIGN PATENT DOCUMENTS

| | | |
|---|---|---|
| JP | 2007-021021 A | 2/2007 |
| JP | 2009-124603 A | 6/2009 |

OTHER PUBLICATIONS

Lagendijk et al., "Video Enhancement and Restoration," "Handbook of Image and Video Processing, 2nd Edition," Academic Press, vol. 21, Jun. 21, 2005, pp. 275-295, XP055204433.

* cited by examiner

IMAGE PROCESSING METHOD AND IMAGE PROCESSING APPARATUS

BACKGROUND OF THE INVENTION

Field of the Invention

The present invention relates to an image processing method and an image processing apparatus which perform correction processing on an abnormal value of X-ray image data.

Description of the Related Art

In a one-dimensional semiconductor detector or a two-dimensional semiconductor detector, an abnormal value in only one pixel is occasionally detected due to, for example, the failure of a pixel caused such as by the incidence of strong cosmic rays, the accumulation of noise or degradation in long exposure. Since the number of such pixels that appear is limited, the adverse effect on the actual measurement and analysis is limited.

However, since the appearance of a pixel with such an abnormal value is likely to damage the reliability of an image, a pixel with an abnormal value has been conventionally corrected. For example, a method is known which performs a measurement two times under the same conditions, compares the obtained two images and thereby identifies an abnormal value.

A method is also known which divides a necessary exposure time into a plurality of short times to perform capturing, collects image frames captured in the individually divided times, focuses on a certain pixel to arrange the data in the individual times in order of size of the data and removes a predetermined number of pixels from the largest or the smallest size. For example, in an imaging apparatus disclosed in patent document 1, when the brightness of image frames obtained in a division period is equal to or more than a predetermined brightness, the image frame per division period is displayed on a display device whereas when the brightness is lower, image frame is determined not to be displayed.

On the other hand, a method is also known which performs exposure and capturing while shaking a detector, grasps a pixel indicating an abnormal value and thereby produces a correction mask. For example, in an X-ray analysis method disclosed in patent document 2, a first data set and a second data set measured while displacing the position of a detector are overlaid on each other, and thus a pixel indicating an abnormal value is detected.

Patent Document

Patent document 1: Japanese Unexamined Patent Application Publication No. 2009-124603

Patent document 2: U.S. Patent Application Publication No. 2005/0259790

However, in the method of performing the measurement twice and the method of dividing the exposure time to remove the pixels of the largest value, since the measurement is performed beyond the necessary measurement time, and part of the measurement results is discarded, the measurement and the analysis are not performed in real time, with the result that the methods are not efficient. Even in the method of previously producing the correction mask, since preparation is necessary, the performance in real time is lowered and it is bothersome to a user, the method is not efficient.

SUMMARY OF THE INVENTION

The present invention is made in view of the foregoing conditions, and an object of the present invention is to provide an image processing method and an image processing apparatus which remove the effects of cosmic rays, noise and defective pixels without losing data in a specified time and which can correct image data in real time, efficiently and with high accuracy.

(1) To achieve the above object, according to the present invention, there is provided an image processing method of performing correction processing on an abnormal value of X-ray image data, the method comprising the steps of: determining whether or not there exists a target element with intensity significantly different from intensity of peripheral elements in a three-dimensional space formed with a time axis and a space axis whose individual elements have an aggregation of intensity obtained by a series of captured image frames; and replacing the intensity of the target element with a replacement value calculated from the intensity of peripheral elements.

In this way, it is possible to remove the effects of cosmic rays, noise and defective pixels without losing data in a specified time and to correct image data in real time, efficiently and with high accuracy. Even when a defective pixel is present, it is not necessary to previously prepare data for the correction, and it is possible to perform the correction for the removal of the abnormal value by using only the image data to be processed.

(2) The image processing method according to the present invention, further comprising the step of: successively storing the series of captured image frames, wherein image data which is determined whether or not there exists the target element and replaced with a replacement value by using a predetermined number of pieces of the stored image data is provided in real time to a system that can be operated by a user. In this way, it is possible to correct the image data in real time by using the series of captured image frames stored successively.

(3) In the image processing method according to the present invention, with respect to an array of intensity taken out by a predetermined condition from the three-dimensional space, it is determined whether or not there exists a target element among elements constituting the array of intensity. In this way, it is possible to efficiently correct the target element by the condition corresponding to a capturing target.

(4) In the image processing method according to the present invention, the series of captured image frames is a plurality of image frames whose exposure times are obtained by dividing an exposure time specified by a user into a plurality of exposure times. In this way, it is not necessary to perform capturing twice under the same conditions, and thus it is possible to correct the removal of the abnormal value by efficiently using the image data.

(5) In the image processing method according to the present invention, the series of captured image frames is a plurality of image frames obtained by a detector at different positions. In this way, even when noise in a specific position of the detector is produced, since on the obtained three-dimensional data, the position of the noise is moved with elapse of time, it is possible to identify and process it as the target element.

(6) In the image processing method according to the present invention, the element is identified by a capturing time of and a pixel position in the image data. In this way, it is possible to efficiently correct the target element for each pixel.

(7) According to the present invention, there is provided an image processing method of performing correction processing on an abnormal value of X-ray image data, the method including the steps of: reading one or a plurality of image frames; performing first processing of determining whether or not there exists a target element with intensity significantly different from intensity of spatially peripheral elements in the read image data, and of identifying the target element as an element of interest, when there is the target element; and performing second processing of determining whether or not there exists a target element with intensity significantly different from intensity at previous or subsequent times, based on the element of interest in an aggregation of the read image data, along a time axis, and of replacing the target element with a replacement value calculated from intensity in peripheral times, when there is the target element.

In this way, when a sample which rapidly changes with time is measured, it is possible to effectively perform the correction. Even when about one or several image frames are used to determine whether or not there exists a target element, since sufficient data points for performing the time axis correction cannot be obtained, it is possible to effectively perform the correction.

(8) According to the present invention, there is provided an image processing method of performing correction processing on an abnormal value of X-ray image data, the method including the steps of: reading one or a plurality of image frames; performing first processing of determining whether or not there exists a target element with intensity significantly different from intensity of elements in previous or subsequent times in an aggregation of the read image data, based on each element, along a time axis, and of replacing the target element with a replacement value calculated from intensity in peripheral times, when there is the target element; and performing second processing of determining whether or not there exists a target element with intensity significantly different from intensity of spatially peripheral elements in each piece of the read image data, and of replacing the target element with a replacement value calculated from the intensity of spatially peripheral elements, when there is the target element.

In this way, when a time delay integral image is acquired, since a plurality of images is acquired while scanning is performed with the detector, the same count is measured over a plurality of pixels, and thus it is possible to significantly effectively perform the correction. Furthermore, a time resolution is greater by about 2 to 4 digits than a general measurement time, and thus it is possible to easily utilize a large amount of data to reduce effects caused by statistical variations.

(9) According to the present invention, there is provided an image processing apparatus that performs correction processing on an abnormal value of X-ray image data, the apparatus comprising: a target element determination part that determines whether or not there exists a target element with intensity significantly different from intensity of peripheral elements in a three dimensional space formed with a space axis and a time axis defined by a series of captured image frames; and a correction part that replaces the intensity of the target element with a replacement value calculated from the intensity of peripheral elements. In this way, it is possible to remove the effects of cosmic rays, noise and defective pixels without losing data in a specified time and to correct image data in real time, efficiently and with high accuracy.

According to the present invention, it is possible to remove the effects of cosmic rays, noise and defective pixels without losing data in a specified time and to correct image data in real time, efficiently and with high accuracy.

DETAILED DESCRIPTION OF THE INVENTION

Embodiments of the present invention are described with reference to the drawings. For ease of understanding of description, in the individual drawings, the same constituent elements are identified with the same reference numbers, and their repeated description can be omitted.

[First Embodiment]

(X-Ray Analysis Apparatus)

Figure 1:
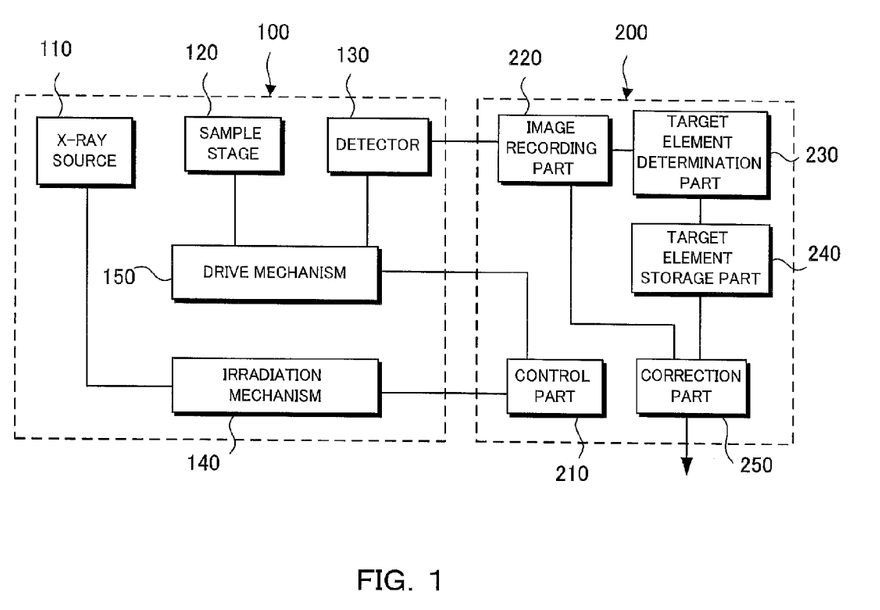
FIG. 1 is a block diagram showing the configuration of an X-ray analysis apparatus and an image processing apparatus according to the present invention.
Figure 2:
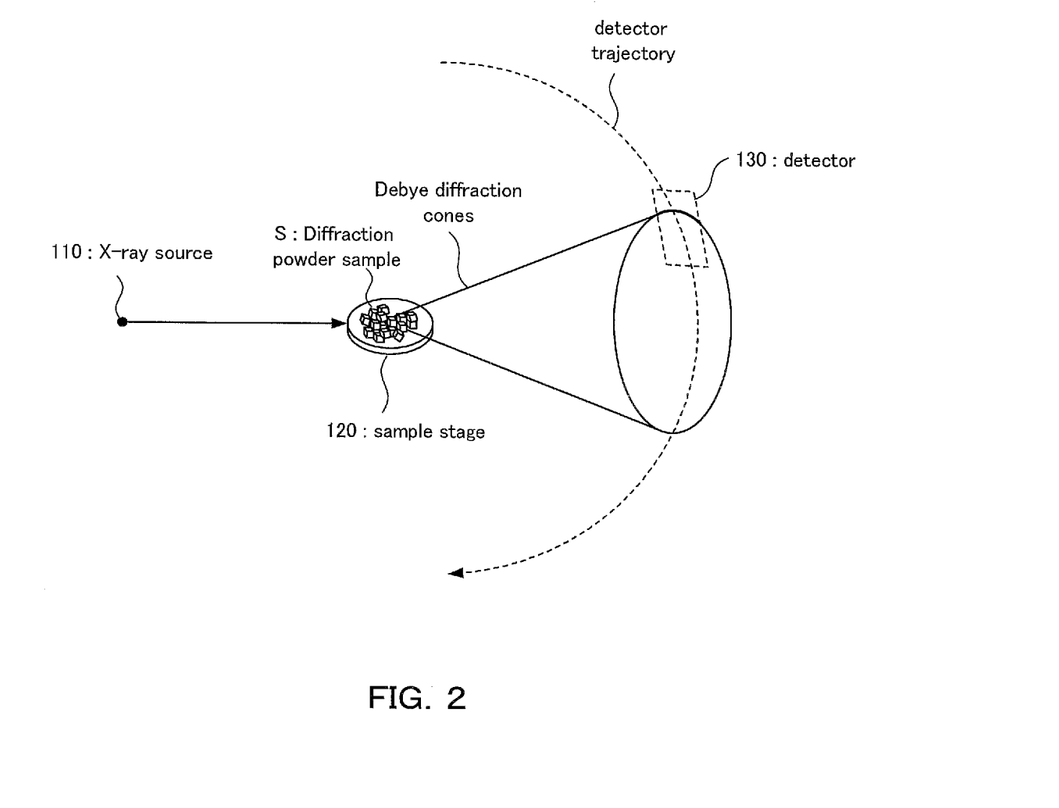
FIG. 2 is a perspective view showing the configuration of the X-ray analysis apparatus.

FIG. 1 is a block diagram showing the configuration of an X-ray analysis apparatus 100 and an image processing apparatus 200. FIG. 2 is a perspective view showing the configuration of the X-ray analysis apparatus 100. As shown in FIGS. 1 and 2, the X-ray analysis apparatus 100 includes an X-ray source 110, a sample stage 120, a detector 130, an irradiation mechanism 140 and a drive mechanism 150.

The X-ray source 110 is formed with an X-ray tube, and radiates a characteristic X-ray of such as Cu or Mo. The characteristic X-ray that is monochromatized is collimated by a collimator or the like so as to have a predetermined diameter, and is thereafter irradiated to a sample S. The irradiated X-ray is scattered, as a diffracted X-ray by the sample S, at an angle of 2θ with respect to the center of the sample S, and is incident on the detection surface of the detector 130.

The sample stage 120 rotatably holds the sample S. Although as an example of the sample S, there is a powder crystal, the sample S may be a single crystal. Although the sample stage 120 may be rotated by θ as the detector 130 is rotated by 2θ, the sample stage 120 preferably generates uniform diffracted X-ray by rotation independently of the detector 130.

Although the detector 130 may be a photon counting-type pixel detector and a one-dimensional detector, it is preferably a two-dimensional detector. The one-dimensional detector is an X-ray detector that has the position resolution of an X-ray intensity on a straight line. The one-dimensional detector can be formed by, for example, aligning, in a straight line, a plurality of minute X-ray receiving elements that can detect an X-ray.

The two-dimensional detector is an X-ray detector that has the position resolution of an X-ray intensity within a plane. The two-dimensional detector is configured by, for example, aligning, within a plane, a plurality of minute X-ray receiving elements, can detect an X-ray for each pixel and can be formed with a semiconductor X-ray detector that can output a signal for each pixel. Examples of such a semiconductor X-ray receiving element include a CCD and a CMOS.

The irradiation mechanism 140 is formed with a power supply and a circuit, and controls the irradiation of the X-ray from the X-ray source 110. The drive mechanism 150 controls the rotation of the sample stage 120 and the movement of the detector 130. When a diffracted X-ray is used, the detector 130 is moved in the direction of a diffraction angle.

(Image Processing Apparatus)

The image processing apparatus 200 performs correction processing on an abnormal value of X-ray image data received from the X-ray analysis apparatus 100. As shown in FIG. 1, the image processing apparatus 200 is formed with, for example, a server mounting a CPU, and includes a control part 210, an image recording part 220, a target element determination part 230, a target element storage part 240 and a correction part 250.

The control part 210 controls the irradiation mechanism 140 and the drive mechanism 150, and coordinates the irradiation mechanism 140 and the drive mechanism 150 to allow uniform X-ray irradiation to the detector 130. A predetermined X-ray is irradiated from the X-ray source 110 to the sample S, the detector 130 is moved on a circle at a constant speed and the sample stage 120 is rotated.

The image recording part 220 records image frames on intensity distribution obtained in the detector 130 without the image frames being processed. The image recording part 220 successively stores series of captured image frames to allow correction processing in real time with the stored image data. In a three-dimensional space formed with a time axis and a space axis whose individual elements have an aggregation of intensity obtained by the series of captured image frames, the target element determination part 230 determines whether or not there exists a target element with intensity significantly different from the intensity of peripheral elements. At that time, it is determined whether or not there exists a target element in the three-dimensional space formed with the time axis and the space axis, among the elements of an array of intensity taken out by a predetermined condition. The predetermined condition is indicated by a region that is specified within the three-dimensional space formed with the time axis and the space axis. For example, when an array of intensity of element data corresponding to a predetermined number of sheets is taken out on the time axis and is to be determined, its region is the predetermined condition. The predetermined number of sheets can be previously set by striking a balance between the accuracy of the correction and a time during which performance in real time can be maintained. Target element information is information that identifies a target element on the image data, and is, for example, a table indicating the position of a target element.

The target element storage part 240 stores the target element information generated as a table or the like. The correction part 250 reads out the target element information stored in the target element storage part 240, uses, on the image data read in, the target element information to correct the image data of the target element and outputs it. The correction is performed by replacing the intensity of the target element with a replacement value calculated from the intensity of peripheral elements. The image data corrected and output are transferred to a system (for example, a user PC) that can be operated by a user. Although in the example described above, the image data on which the correction processing is performed by the server are transferred to the user PC, a correction processing system and an operation system by the user may be separated by software within a user terminal, and the image data corrected by the correction processing system may be transferred to the operation system.

(Image Data)

Figure 3:
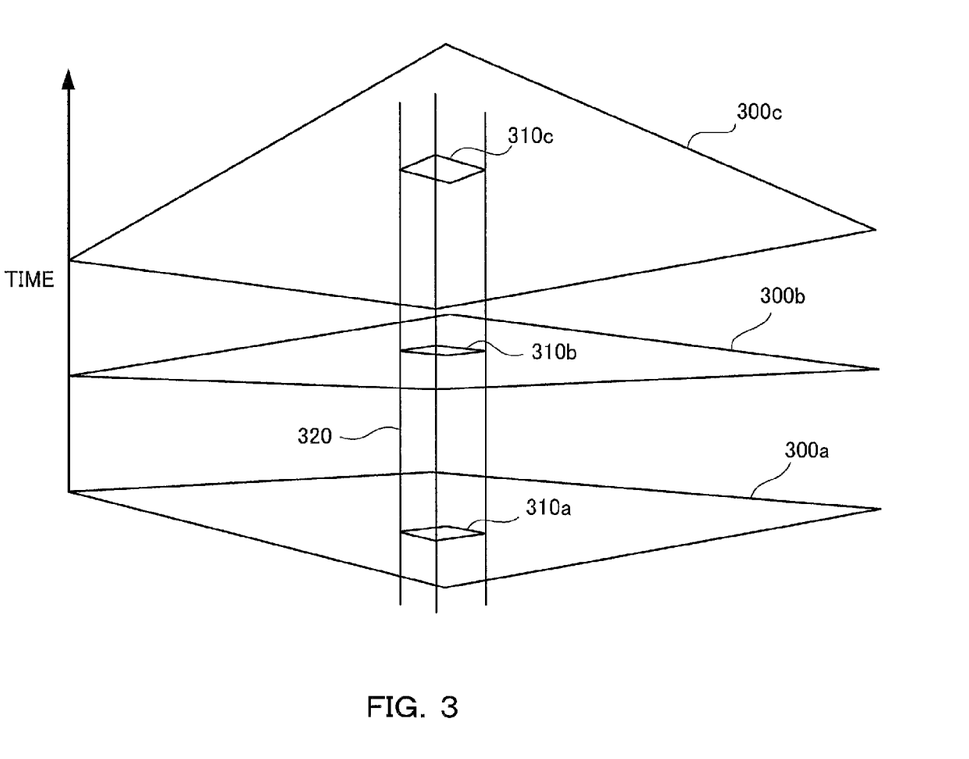
FIG. 3 is a diagram showing X-ray image data as a three-dimensional space.

FIG. 3 is a diagram showing the X-ray image data as the three-dimensional space. In the example shown in FIG. 3, the X-ray is received by three detectors 130, and thus two-dimensional image frames are obtained at given time intervals, and can be expressed as a series of image frames 300*a* to 300*c* within the three-dimensional space formed with a two-dimensional space and the time axis. Here, when attention is focused on specific elements 310*a* to 310*c* on the space, they are represented as columns 320 parallel to the time axis having a cross section in the form of an element.

The image frames obtained by the X-ray analysis apparatus 100 are sent to the image processing apparatus 200 and is recorded therein, and thus an aggregation of the image data is stored, with the result that it is possible to grasp an aggregation of the image data on the three-dimensional space shown in FIG. 3.

The series of captured image frames is preferably a plurality of image frames whose exposure times are obtained by dividing an exposure time specified by a user into a plurality of exposure times. In this way, it is not necessary to perform measurement twice under the same conditions, and thus it is possible to correct the removal of the abnormal value by efficiently utilizing the image data. The space correction and the time axis correction can be considered as follows.

(Space Correction)

In the space correction, the spatial smoothness of image data measured in a certain time is a condition for the determination as to whether or not there exists a target element, and in general, the spatial smoothness is arbitrary. Hence, a failure determination is performed by comparison with a calculation value estimated by assumptions as indicated in (1) to (3) below.

(1) It is assumed that all peaks correspond to a certain distribution (for example, two-dimensional Gaussian distribution). However, in this case, it is necessary to have knowledge on the obtained image.

(2) It is assumed that the spatial smoothness is constant in a certain range (for example, in a region of n×n pixels). A case where this assumption is made over the entire range of the detector corresponds to uniform irradiation. This is a special case of above item (1).

(3) It is assumed that the spatial smoothness is zero at all pixels. This case is called a dark frame that is used for the simple detection of HotPixel (pixel that is always non-zero) in a general camera or the like.

Although in the real time correction that is an object of the present invention, it is necessary to provide the assumption of above item (1), since it depends on the beam shape of the X-ray source, the configuration of the apparatus and the sample, it lacks versatility. Hence, a determination is made in a very narrow range (for example, 3×3), and thus it is used as a versatile filter. Since a space resolution is greater by about −1 to 1 digits than the beam size, when information on nine or more pixels is to be used, preliminary knowledge is required.

(Time Axis Correction)

In the time axis correction, the temporal smoothness of a plurality of series of captured image frames measured in a certain position is a criteria for the determination. A target sample needs to be stable in terms of time, but in many cases, this assumption holds true whereas when the assumption does not hold true, in most cases, it is found before the measurement whether or not the assumption holds true, and thus it is possible to cope with it.

In particular, when a time delay integral image is acquired, since a plurality of images is acquired while scanning is performed with the detector, the same count is measured over a plurality of pixels, and thus this is a significantly effective method. Furthermore, a time resolution is greater by about 2 to 4 digits than a general measurement time, and thus it is possible to easily use data on 100 or more elements for the determination of a target element.

(Image Processing Method)

The basic operation of the image processing apparatus 200 configured as described above will be described. First, one or a plurality of image frames is read from the X-ray analysis apparatus 100. Then, it is determined whether or not there exists a target element with intensity significantly different from the intensity of spatially peripheral elements in the read image data, and when there is the target element, the target element is identified as an element of interest (the first processing step). Whether or not the intensity is significantly different can be determined by, for example, whether the difference from the average value of the intensity of spatially peripheral elements exceeds a threshold value.

Then, based on the element of interest in the aggregation of the read image data, along the time axis, it is determined whether or not there exists a target element with intensity significantly different from intensity at of the elements in previous or subsequent times. Then, when there is the target element, the correction is performed by replacing the target element with a replacement value calculated from the temporally intensity of peripheral elements (the second processing step).

In this way, the specified time data is utilized, the effects of cosmic rays, noise and defective pixels are removed and thus it is possible to perform the correction with high accuracy. Even when there is a defective pixel, it is not necessary to previously prepare data for the correction, and thus it is possible to perform the correction for the removal of the abnormal value by using only the image data to be processed. The determination of whether or not there exists a target element based on the element of interest along the time axis refers to comparison between the previous or subsequent times in the columns on the time axis including the element of interest as shown in FIG. 3.

Although in the determination of whether or not there exists a target element as described above, any one of the corrections on the space axis and the time axis may be performed first, in the present embodiment, a case where the correction on the space axis is first performed will be described. For example, the abnormal value on the space is corrected, and not only such a correction but also a correction for an abnormal value on the time axis is performed based on the correction, with the result that it is possible to effectively remove the abnormal value. The correction in such an order can be effective when a sample which changes rapidly with time is measured. When about one or several image frames are used to determine whether or not there exists a target element, since sufficient data points for performing the time axis correction cannot be obtained, the target element is corrected by the space correction, then a weak time axis correction filer is operated and thus a real-time correction is performed, with the result that this real-time correction can be effective.

The element is identified by the capturing time of and the pixel position in the image data. Thus, it is possible to efficiently correct the target element for each pixel. The element is not necessarily a pixel, and may be a region where pixels are aggregated.

(Specific Example of the Processing)

Figure 4:
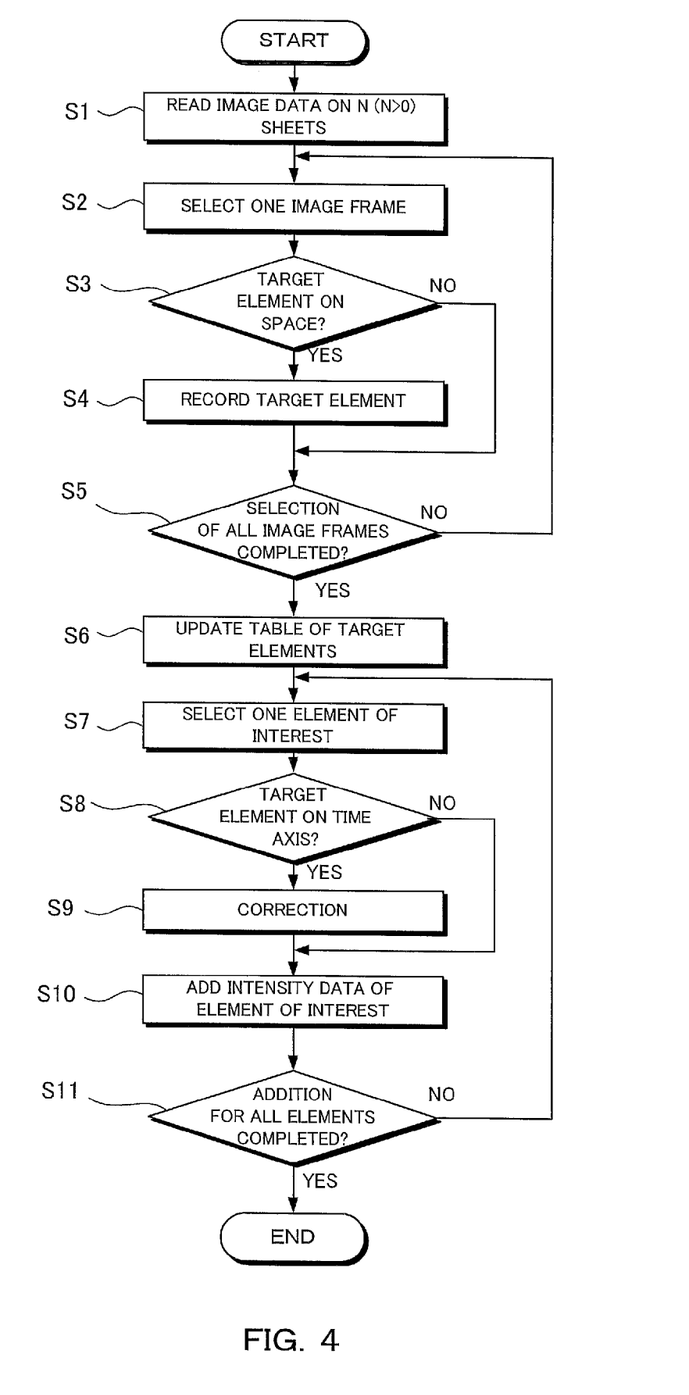
FIG. 4 is a flowchart showing an example of an image processing method according to a first embodiment.

A specific example of the image processing method will then be described. FIG. 4 is a flowchart showing an example of the image processing method. First, the image processing apparatus 200 reads N (N>0) image frames from the X-ray analysis apparatus 100 (step S1). Then, one of image frames is selected from the read N image frames (step S2), and whether or not there exists a target element is determined (step S3). Here, it is possible to perform the determination by whether or not the difference between the average value of the intensity of spatially peripheral elements and the intensity of the element of interest exceeds a predetermined threshold value. Alternatively, it is also possible to perform the determination by, for example, whether or not a value obtained by performing Fourier transform in a given region exceeds a given value. Although the case where N=1 is included, it is preferable to provide a limitation in which it is possible to perform the time axis correction when N≥2.

When as a result of the determination, a target element is found, the target element is recorded (step S4). The element is identified by position information and time information on the space. When no target element is found, the process proceeds to step S5.

Then, whether or not all the image frames are selected is determined (step S5). When all the image frames have not been selected yet, the process returns to step S2 where an image frame which has not been selected is selected. When all the image frames are selected, the process proceeds to step S6.

Then, the table of target elements is updated (step S6). In this way, the recording of the target element is reflected on the table, and thus it is possible to correct the abnormal intensity of the target element by using the table.

Among the target elements identified as described above, one element is selected as the element of interest (step S7). The selected elements of interest are aligned again in descending order of intensity on the time axis, and it is determined whether or not there exists a target element with intensity which exceeds a predetermined threshold value for the average value of the intensity of the previous or subsequent elements (step S8).

When as a result of the determination, there is no target element on the time axis, the process proceeds to step S10. When there is a target element on the time axis, the correction is performed (step S9). The correction may be either the space correction or the time axis correction. The pieces of intensity of the elements of interest obtained as described above are added (step S10). Whether the addition for all the elements is completed is determined, and when the addition is not completed, the process returns to step S7. When the addition is completed, the process is finished without being processed.

(Correction Processing)

Figure 5:
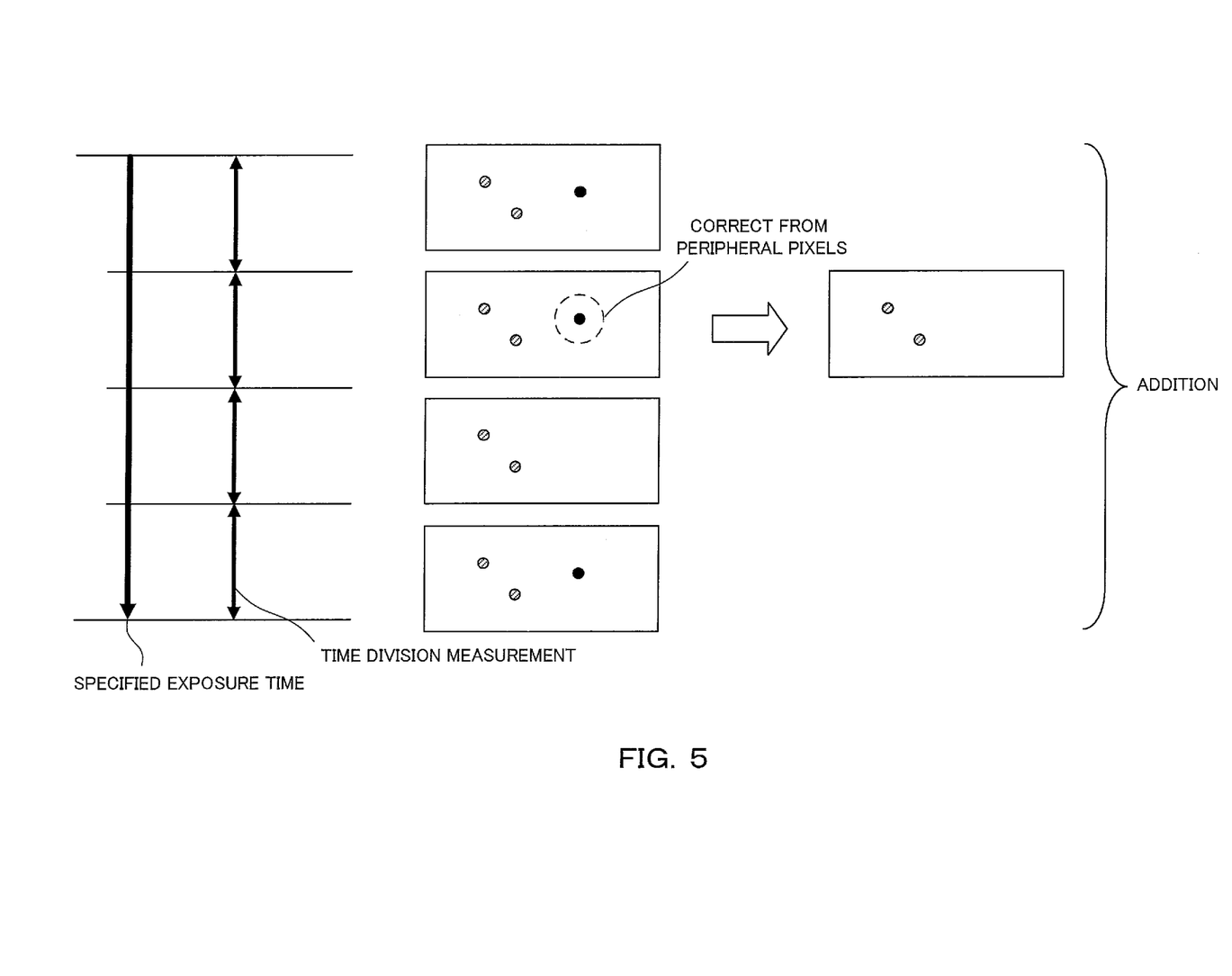
FIG. 5 is a diagram showing a correction using the peripheral elements in a space.

As described above, the correction includes the space correction and the time axis correction. FIG. 5 is a diagram showing a correction using the peripheral elements (pixels) in space. As shown in FIG. 5, when an X-ray image is detected in times obtained by dividing a specified exposure time into four times, image frame in each of the four divided times can be obtained. When in such image frames, there is a pixel whose value is significantly different from the intensity of spatially peripheral elements, it is possible to replace the abnormal intensity of the pixel with intensity obtained by referencing the intensity of the spatially peripheral pixels. Finally, the image frames over the entire exposure time including the image frames undergoing such a space correction are added together, and thus it is possible to obtain desired image data.

Figure 6:
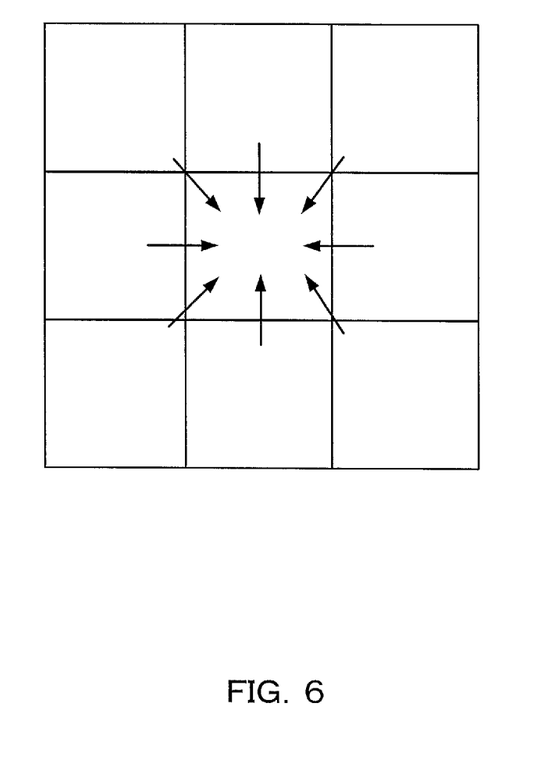
FIG. 6 is a diagram showing elements referenced at the time of correction.

FIG. 6 is a diagram showing elements referenced at the time of correction. As shown in FIG. 6, there is a correction method of replacing the intensity of a pixel of interest in the center with intensity calculated based on a first close pixel and a second close pixel.

Figure 7:
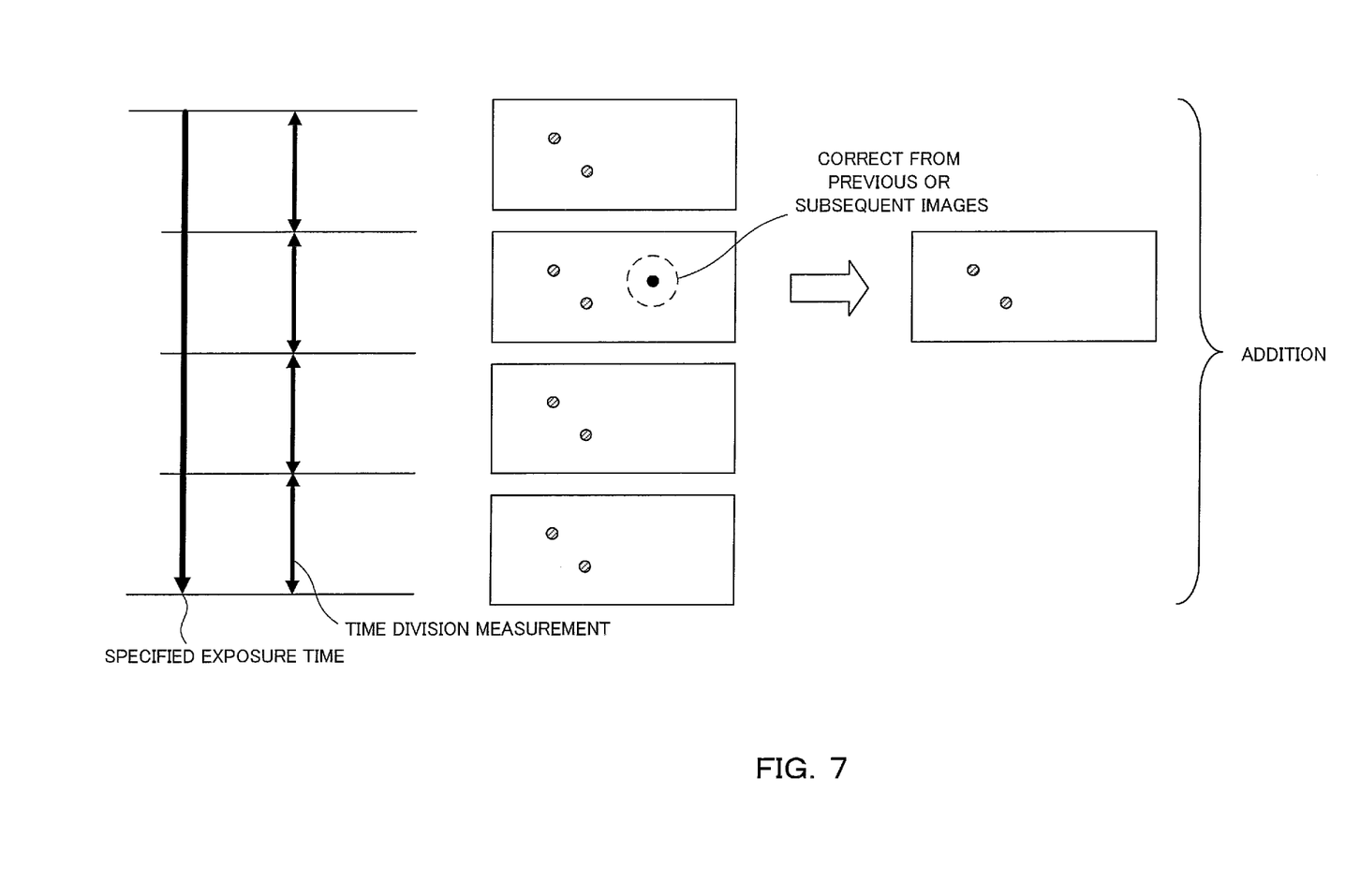
FIG. 7 is a diagram showing a correction using the peripheral elements on the time axis.

FIG. 7 is a diagram showing a correction using the peripheral elements on the time axis. When an X-ray image is detected in times obtained by dividing a specified exposure time into four times, image frame in each of the four divided times can be obtained. In the example shown in FIG. 7, it is possible to replace the abnormal value with, for example, the average value thereof by using the intensity of pixels present in the same positions as in the previous or subsequent image frames. Finally, it is possible to obtain desired image data by adding the image frames over the entire exposure time including the image data undergoing such a time axis correction.

[Second Embodiment]

Although in the embodiment described above, the space correction is performed, and thereafter the time axis correction is performed, the order may be reversed such that the time axis correction is performed and thereafter the space correction is performed. In this case, since main target elements are previously corrected by the time axis correction, in the space correction, only a simple filter such as isolated point removal is applied sufficiently. The space correction is performed after summation of data that has undergone the time axis correction, and thus it is possible to reduce effects caused by statistical variations in data.

Figure 8:
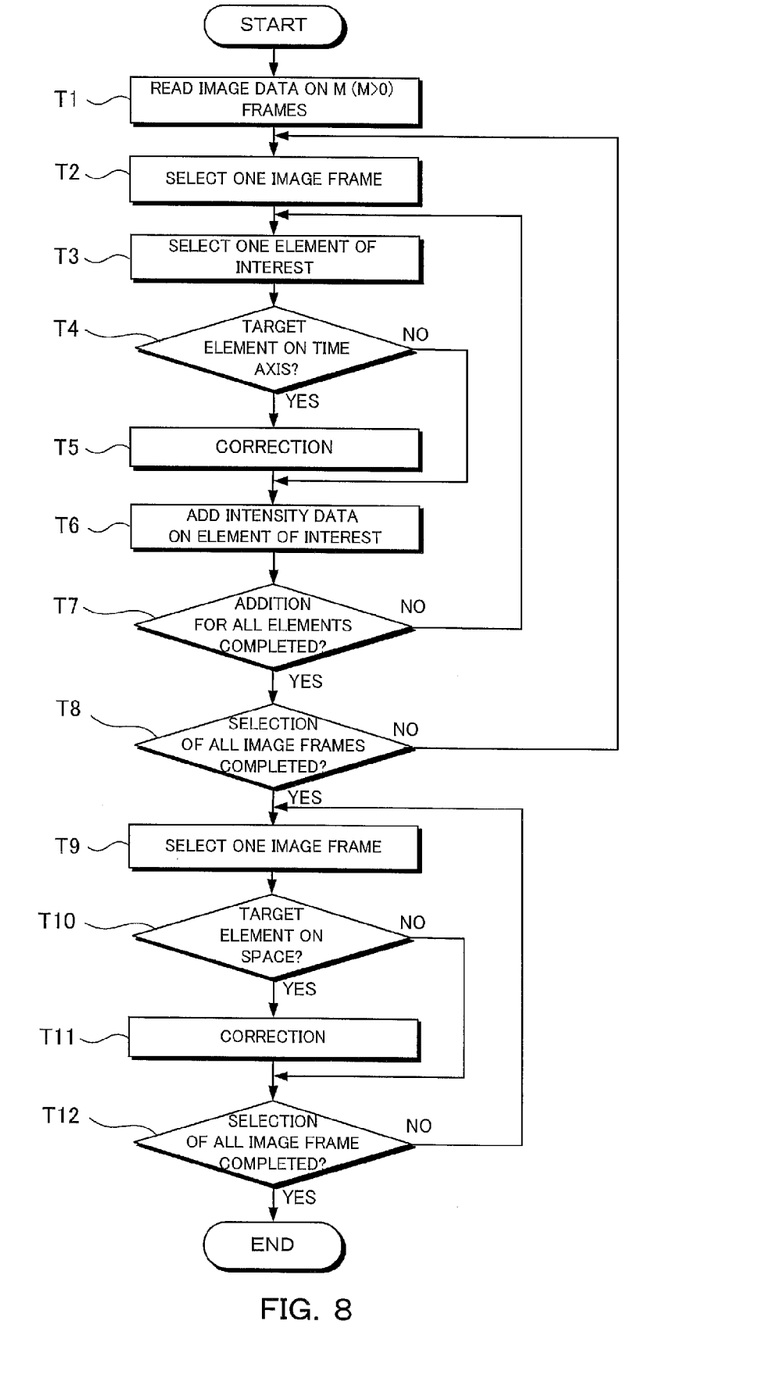
FIG. 8 is a flowchart showing an example of an image processing method according to a second embodiment.

FIG. 8 is a flowchart showing an example of an image processing method of performing the space correction after the time axis correction. First, the image processing apparatus 200 reads M (M>0) image frames from the X-ray analysis apparatus 100 (step T1). Then, one image frames is selected from the read M image frames (step T2), and one element is selected as the element of interest (step T3). Then, it is determined on the selected element of interest whether or not there exists a target element for the intensity of the previous or subsequent elements on the time axis (step T4). Although the case where M=1 is also included, it is preferable to provide a limitation in which it is possible to perform the time axis correction when M≥2.

As a result of the determination, when there is no target element on the time axis, the process proceeds to step T6. When there is a target element on the time axis, the correction is performed (step T5). Then, the pieces of intensity of the obtained elements of interest are added (step T6). It is determined whether the addition for all the elements is completed (step T7), and when the addition is not completed, the process returns to step T3. When the addition is determined to be completed, the process proceeds to step T8.

Furthermore, it is determined whether or not all the image frames are selected (step T8), and when all the image frames are not selected, the process returns to step T2, and the image frames that have not been selected are selected. When all the image frames are selected, the process proceeds to step T9.

Then, among the read M image frames, one image frames is selected (step T9), and it is determined whether there is a target element on space for the data of the peripheral elements (step T10). In that case, it is possible to make the determination by, for example, whether or not the difference between the average value of the intensity of spatially peripheral elements and the intensity of the element of interest exceeds a threshold value.

As a result of the determination, when a target element is found, the correction is performed (step T11). When no target element is found, the process proceeds to step T12. Then, whether or not all the image frames is selected is determined (step T8). When it is not completed, the process returns to step T9. When it is completed, the process is finished without being processed.

[Third Embodiment]

Although in the embodiments described above, the image frames obtained by the detector 130 being fixed is used, image frames obtained while the detector is being moved may be used. When the detector 130 is moved, the series of captured image frames is a plurality of image frames obtained by the detector at different positions. In this way, even when noise in a specific position of the detector 130 is produced, since on the obtained three-dimensional data, the position of the noise is moved on the space fixed with elapse of time, it is possible to identify it as a target element to perform the correction processing.

Figure 9:
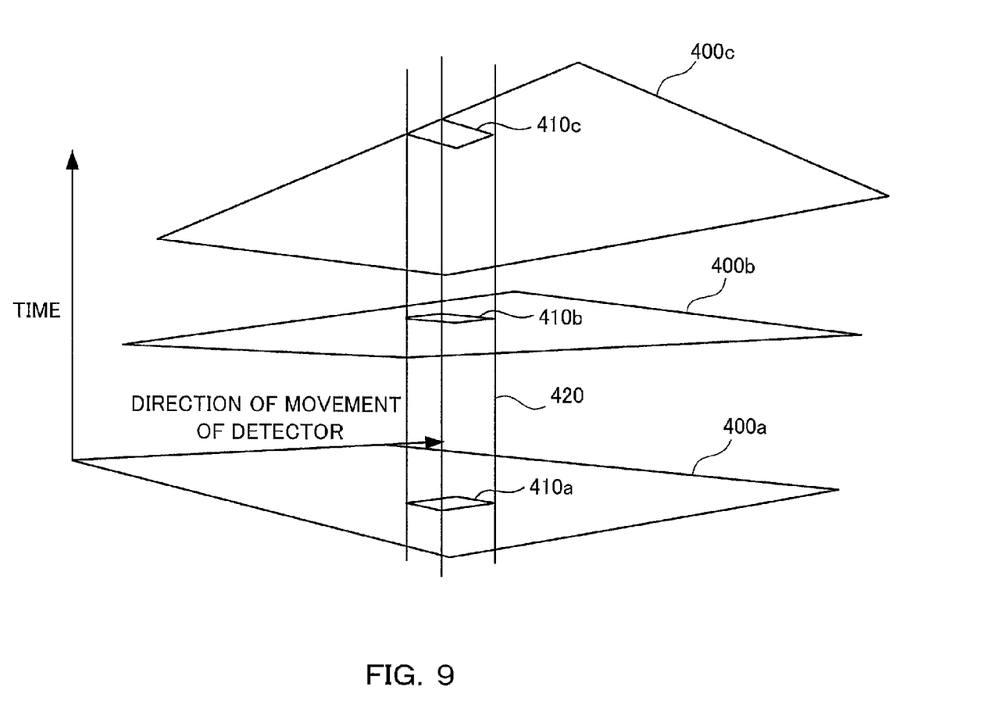
FIG. 9 is a diagram showing the X-ray image data as the three-dimensional space when capturing is performed while a detector is being moved.

FIG. 9 is a diagram showing the X-ray image data as the three-dimensional space when capturing is performed while the detector is being moved. In the example shown in FIG. 9, three pieces of two-dimensional image frames which are moved in a given direction are obtained at given time intervals, and can be expressed as a series of image frames 400a to 400c within the three-dimensional space formed with the two-dimensional space and the time axis. Here, when attention is focused on specific elements 410a to 410c on the space, they are represented as columns 420 parallel to the time axis having a cross section in the form of an element. However, each piece of the intensity is detected by a different pixel on the detector 130.

In the X-ray analysis apparatus 100, the image frames obtained while the detector 130 is being moved is sent to the image processing apparatus 200 and is recorded therein, and thus an aggregation of different image frames in the individual positions is stored. Such an aggregation of the image data can be grasped as an aggregation of the image data on the three-dimensional space as shown in FIG. 9.

[Working Example]

Figure 10A:
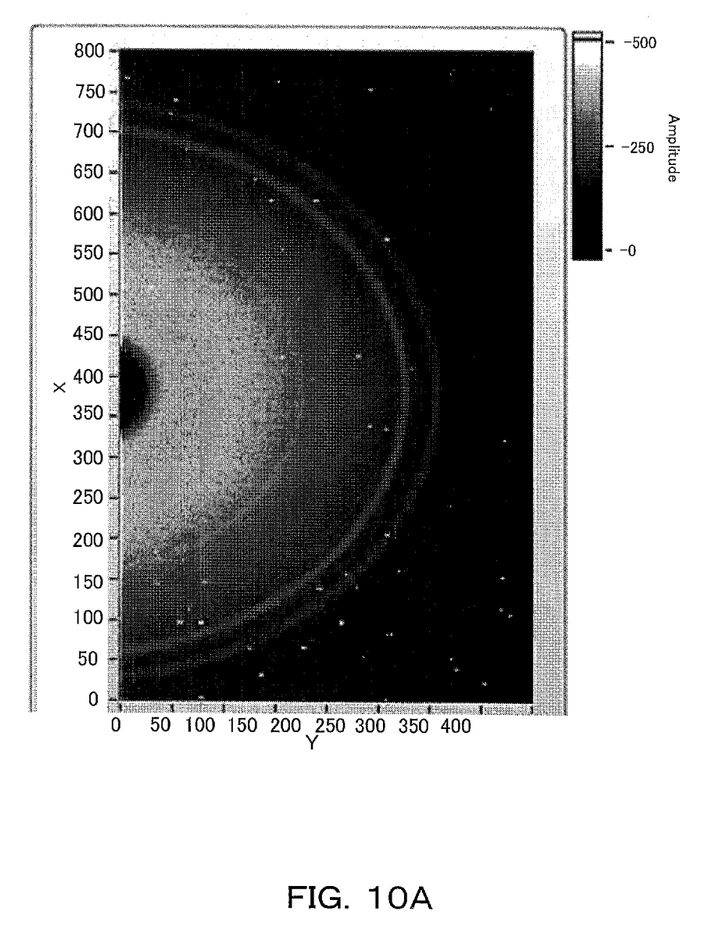
FIG. 10A is a diagram showing image data when no correction is made.
Figure 10B:
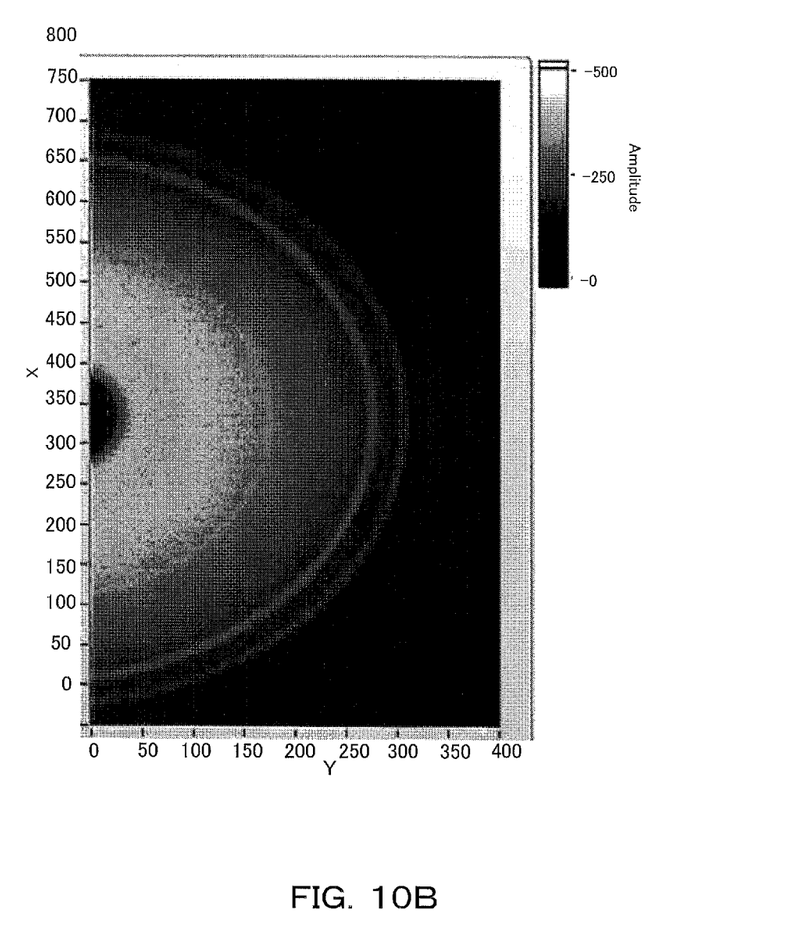
FIG. 10B is a diagram showing image data when a correction is made.

Then, a diffraction image of an X-ray was obtained by the apparatus configuration as shown in FIG. 2, and an abnormal value was corrected with the processing as shown in FIG. 4. FIGS. 10A and 10B are diagrams showing image data when no correction was performed and image data when a correction was performed, respectively. It is found that in the image data when no correction was performed, pixels where abnormal values were indicated appeared as point-like noises whereas in the image data when a correction was performed, almost no point-like noises were produced.

What is claimed is:

1. An image processing method of performing correction processing on received X-ray image data, the method comprising the steps of:

receiving a series of image frames captured by a detector;
identifying elements of interest by determining whether or not there exists target elements with intensities significantly different from intensities of spatially peripheral elements, in a three dimensional space formed with a space axis and a time axis defined by a series of captured image frames;
for each identified element of interest, determining whether the element of interest is a target element, by determining whether the intensity of the identified element of interest is significantly different from intensities of temporal peripheral elements, in a three dimensional space formed with a space axis and a time axis defined by a series of captured image frames; and
for each target element, replacing the intensity of the target element with a replacement value calculated from the intensities of temporal peripheral elements,
wherein an intensity is significantly different from intensities of peripheral elements if the difference between the intensity and a filtered value of the intensities of peripheral elements exceeds a predetermined threshold, and
wherein an element of interest is identified by position information on the space and timing information.

2. The image processing method according to claim 1, further comprising the step of:
successively storing the series of captured image frames, wherein the processed image data is provided in real time to a system that can be operated by a user.

3. The image processing method according to claim 1, wherein with respect to an array of intensity taken out by a predetermined condition from the three-dimensional space, it is determined whether or not there exists a target element among elements constituting the array of intensity.

4. The image processing method according to claim 1, wherein the series of captured image frames is a plurality of image frames whose exposure times are obtained by dividing an exposure time specified by a user into a plurality of exposure times.

5. The image processing method according to claim 1, wherein the series of captured image frames is a plurality of image frames obtained by a detector at different positions.

6. The image processing method according to claim 1, wherein the element is identified by a capturing of time and a pixel position in the image data.

7. An image processing method of performing correction processing on received X-ray image data, the method comprising the steps of:
receiving a series of image frames captured by a detector;
identifying spatial elements of interest by determining whether or not there exists a target element with an intensity significantly different from intensities of spatially peripheral elements in the received image data, and identifying the target element as an element of interest, when there is the target element; and
identifying temporal elements of interest by determining whether or not there exists a target element with an intensity significantly different from intensities of elements in previous or subsequent times, based on identified element of interest in an aggregation of the received image data, along a time axis; and
replacing the intensity value of the identified temporal elements of interest with a replacement value calculated from intensity values in peripheral times
wherein an intensity is significantly different from intensities of peripheral elements if the difference between the intensity and a filtered value of the intensities of peripheral elements exceeds a predetermined threshold, and
wherein an element of interest is identified by position information on the space and timing information.

8. An image processing method of performing correction processing on received X-ray image data, the method comprising the steps of:
receiving a series of image frames captured by a detector;
identifying temporal elements of interest by determining whether or not there exists a target element with an intensity significantly different from intensities of elements in previous or subsequent times in an aggregation of the received image data, based on each element, along a time axis
replacing the intensity value of the identified temporal elements of interest with a replacement value calculated from intensity values in peripheral times; and
identifying spatial elements of interest by determining whether or not there exists a target element with an intensity significantly different from intensity values of spatially peripheral elements in a frame of the received image data; and
replacing the intensity value of the identified spatial elements of interest with a replacement value calculated from the intensity values of spatially peripheral elements,
wherein an intensity is significantly different from intensities of peripheral elements if the difference between the intensity and a filtered value of the intensities of peripheral elements exceeds a predetermined threshold, and
wherein an element of interest is identified by position information on the space and timing information.

9. An image processing apparatus that performs correction processing on an abnormal value of X-ray image data, the apparatus comprising:
a controller configured to control an irradiation mechanism and a drive mechanism; and
a central processing unit (CPU) configured to
determine whether or not there exists a target element with intensity significantly different from intensity of peripheral elements, in a three dimensional space formed with a space axis and a time axis defined by a series of captured image frames; and
replace the intensity of the target element with a replacement value calculated from the intensity of peripheral elements,
wherein an intensity is significantly different from intensities of peripheral elements if the difference between the intensity and a filtered value of the intensities of peripheral elements exceeds a predetermined threshold, and
wherein an element of interest is identified by position information on the space and timing information.

* * * * *